United States Patent
Zhuang et al.

(10) Patent No.: US 7,426,175 B2
(45) Date of Patent: Sep. 16, 2008

(54) METHOD AND APPARATUS FOR PILOT SIGNAL TRANSMISSION

(75) Inventors: Xiangyang Zhuang, Hoffman Estates, IL (US); Kevin L. Baum, Rolling Meadows, IL (US); Vijay Nangia, Schaumburg, IL (US); Frederick W. Vook, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/813,476

(22) Filed: Mar. 30, 2004

(65) Prior Publication Data
US 2005/0226140 A1    Oct. 13, 2005

(51) Int. Cl.
*H04J 11/00* (2006.01)

(52) U.S. Cl. .................. 370/203; 370/331; 370/342; 375/134; 375/137; 375/140; 375/148; 455/436

(58) Field of Classification Search .......... 370/203, 370/252, 310, 331, 332, 334, 335, 342, 350; 375/134, 137, 140, 142, 143, 144, 145, 148, 375/149, 299
See application file for complete search history.

(56) References Cited

U.S. PATENT DOCUMENTS

| | | | |
|---|---|---|---|
| 5,493,563 A * | 2/1996 | Rozanski et al. | 370/332 |
| 6,430,166 B1 * | 8/2002 | Bejjani et al. | 370/320 |
| 6,704,552 B1 * | 3/2004 | Matsumoto | 455/164.1 |
| 6,744,807 B1 * | 6/2004 | Linde et al. | 375/140 |
| 6,804,307 B1 * | 10/2004 | Popovic | 375/299 |
| 2002/0009125 A1 * | 1/2002 | Shi | 375/139 |
| 2002/0181509 A1 * | 12/2002 | Mody et al. | 370/480 |
| 2003/0152136 A1 * | 8/2003 | Roman | 375/140 |
| 2007/0165588 A1 * | 7/2007 | McCoy | 370/344 |
| 2007/0217530 A1 * | 9/2007 | Hosseinian et al. | 375/260 |

* cited by examiner

*Primary Examiner*—Chi H. Pham
*Assistant Examiner*—Shick Hom

(57) ABSTRACT

Pilot sequences are constructed from distinct "classes" of chirp sequences that have an optimal cross correlation property. Utilization of chirp sequences for pilot sequences results in pilot sequences that have optimal or nearly-optimal cross correlation and auto-correlation properties.

28 Claims, 1 Drawing Sheet

METHOD AND APPARATUS FOR PILOT SIGNAL TRANSMISSION

FIELD OF THE INVENTION

The present invention relates generally to pilot signal transmission, and in particular to a method and apparatus for pilot signal transmission in a communication system.

BACKGROUND OF THE INVENTION

A pilot signal (or preamble) is commonly used for communication systems to enable the receiver to perform a number of critical functions, including but not limited to, the acquisition and tracking of timing and frequency synchronization, the estimation and tracking of desired channels for subsequent demodulation and decoding of the information data, the estimation and monitoring of the characteristics of other channels for handoff, interference suppression, etc. Several pilot schemes can be utilized by communication systems, and typically comprise the transmission of a known sequence at known time intervals. A receiver, knowing the sequence and time interval in advance, utilizes this information to perform the above-mentioned functions.

Several criteria are important when determining pilot sequences for communication systems. Among these criteria is the ability to have good auto-correlation for each of the pilot sequences utilized, and at the same time the ability to have good cross-correlation between any two different pilot sequences. Auto- and cross-correlation are sequences themselves corresponding to different shifts. Auto-correlation at shift-d is defined as the result of summing over all entries after an element-wise multiplication between the sequence and its conjugated replica after shifting it by d entries (d can be positive or negative for right or left shift). Cross-correlation at shift-d is defined as the result of summing over all entries after an element-wise multiplication between a sequence and another sequence that is conjugated and shifted by d entries with respect to the first sequence. "Good" auto-correlation results in each pilot sequence having a minimal auto-correlation value at all shifts of interest (i.e., a range of d, except for d=0). "Good" cross-correlation results in the pilot sequence having a minimal cross-correlation value at all shifts of interest. When the auto-correlation is zero at all d, except for d=0, it is referred to as "ideal" auto-correlation. Since the cross-correlation of two sequences that have ideal auto-correlation cannot be zero at all d, the minimum of the maximum cross-correlation values at all shifts can be reached only when the cross-correlation at all d is equal in amplitude, which is referred to as having "optimal" cross-correlation.

Since the received signal after propagation consists of replicas of the delayed pilot sequence after some scaling factors, the ideal auto-correlation property of the pilot makes the estimation of the channel scaling factors at different delays possible. The optimal cross-correlation property between any two pilot sequences will minimize the interference effect seen at the receiver that is caused by any pilot sequences other than the desired one (i.e., one that the receiver is tuned to). Good cross-correlation makes the detection of the desired pilot signal and the estimation of the desired channel characteristics more reliable, which enables the receiver to perform synchronization and channel estimation more reliably.

Various techniques have been used in the past to design systems with efficient pilot sequences. For example, in the current CDMA-based cellular system, the pilot sequence in a cell is a Walsh code that is scrambled by a cell-specific scrambling code (long code). This effectively randomizes the pilot sequence for each cell. Channel estimation of the neighboring base stations, when required during a soft handoff, is simply performed by correlating the received signal with the neighboring base station's long code scrambled pilot sequences. But the cross-correlation property of two random pilot sequences is not optimal, and thus a larger channel estimation error can be expected. Therefore, a need exists for a method and apparatus for pilot signal or preamble transmission that optimizes both the cross correlation between pilot signals, as well as optimizing each pilot signal's auto correlation.

DETAILED DESCRIPTION OF THE DRAWINGS

To address the above-mentioned need, a method and apparatus for pilot signal transmission is disclosed herein. In particular, pilot sequences are constructed from distinct "classes" of chirp sequences that have an optimal cyclic cross correlation property while satisfying the ideal cyclic auto-correlation requirement. Utilization of chirp sequences for pilot sequences results in pilot channels that have good cross correlation as well as having good auto-correlation.

The present invention encompasses a method for assigning a pilot sequence to communication units within a communication system. The method comprises the steps of assigning a first communication unit a first pilot sequence, wherein the first pilot sequence is selected from a group of pilot sequences constructed from a set of Generalized Chirp-Like (GCL) sequences, and then assigning a second communication unit a second pilot sequence taken from the group of pilot sequences constructed from the set of GCL sequences.

The present invention additionally encompasses a method comprising the steps of receiving a pilot sequence as part of an over-the air transmission, wherein the pilot sequence is constructed from a set of Generalized Chirp-Like (GCL) sequences, and utilizing the pilot sequence for at least acquisition and tracking of timing and frequency synchronization, estimation and tracking of desired channels for subsequent demodulation and decoding, estimation and monitoring of characteristics of other channels for handoff purposes, and interference suppression.

Finally, the present invention encompasses a communication unit comprising pilot channel circuitry for transmitting or receiving a pilot channel sequence, wherein the pilot channel sequence comprises a sequence unique to the communication unit and is constructed from a GCL sequence.

Figure 1:
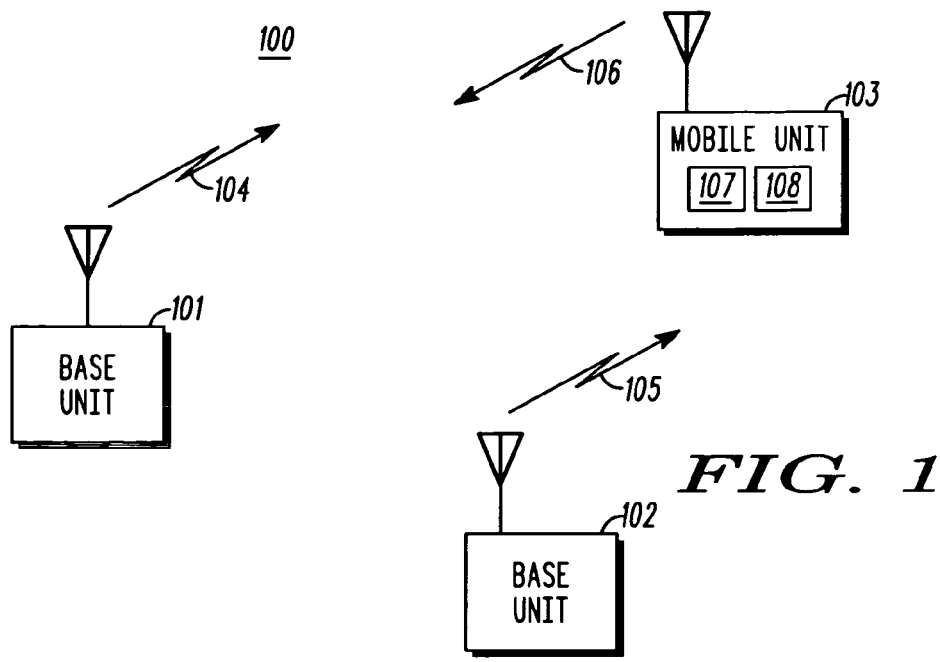
FIG. 1 is a block diagram of a communication system.

Turning now to the drawings, where like numerals designate like components, FIG. 1 is a block diagram of communication system 100 that utilizes pilot transmissions. Communication system utilizes an Orthogonal Frequency Division Multiplexing (OFDM) protocol; however in alternate embodiments communication system 100 may utilize other digital cellular communication system protocols such as a Code Division Multiple Access (CDMA) system protocol, a Frequency Division Multiple Access (FDMA) system protocol, a Spatial Division Multiple Access (SDMA) system protocol or a Time Division Multiple Access (TDMA) system protocol, or various combinations thereof.

As shown, communication system 100 includes base unit 101 and 102, and remote unit 103. A base unit comprises a transmit and receive unit that serves a number of remote units within a sector. As known in the art, the entire physical area served by the communication network may be divided into cells, and each cell may comprise one or more sectors. When multiple antennas are used to serve each sector to provide various advanced communication modes (e.g., adaptive beamforming, transmit diversity, transmit SDMA, and multiple stream transmission, etc.), multiple base units can be deployed. These base units within a sector may be highly integrated and may share various hardware and software components. For example, all base units co-located together to serve a cell can constitute what is traditionally known as a base station. Base units 101 and 102 transmit downlink communication signals 104 and 105 to serving remote units on at least a portion of the same resources (time, frequency, or both). Remote unit 103 communicates with one or more base units 101 and 102 via uplink communication signal 106.

It should be noted that while only two base units and a single remote unit are illustrated in FIG. 1, one of ordinary skill in the art will recognize that typical communication systems comprise many base units in simultaneous communication with many remote units. It should also be noted that while the present invention is described primarily for the case of downlink transmission from multiple base units to multiple remote units for simplicity, the invention is also applicable to uplink transmissions from multiple remote units to multiple base units. A base unit or a remote unit may be referred to more generally as a communication unit.

Figure 2:
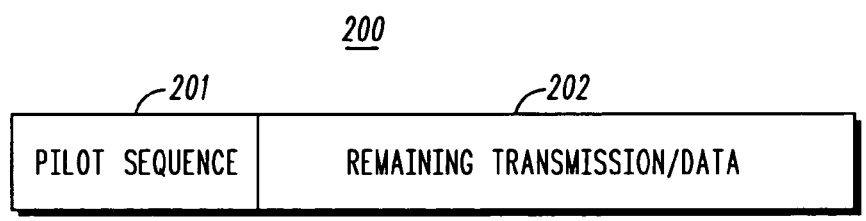
FIG. 2 illustrates pilot signal transmission for the communication system of FIG. 1.

As discussed above, pilot assisted modulation is commonly used to aid in many functions such as channel estimation for subsequent demodulation of transmitted signals. With this in mind, base units 101 and 102 transmit known sequences at known time intervals as part of their downlink transmissions. Remote unit 103, knowing the sequence and time interval, utilizes this information in demodulating/decoding the transmissions. Such a pilot transmission scheme is illustrated in FIG. 2. As shown, downlink transmissions 200 from base units 101 and 102 typically comprise pilot sequence 201 followed by remaining transmission 202. The same or a different sequence can show up one or multiple times during the remaining transmission 202. Thus, each base unit within communication system 100 comprises pilot channel circuitry 107 that transmits one or more pilot sequences along with data channel circuitry 108 transmitting data.

It should be noted that although FIG. 2 shows pilot sequence 201 existing at the beginning of a transmission, in various embodiments of the present invention, the pilot channel circuitry may include pilot sequence 201 anywhere within downlink transmission 200, and additionally may be transmitted on a separate channel. Remaining transmission 202 typically comprises transmissions such as, but not limited to, sending information that the receiver needs to know before performing demodulation/decoding (so called control information) and actual information targeted to the user (user data).

As discussed above, it is important for any pilot sequence to have optimal cross-correlation and ideal auto-correlation. With this in mind, communication system 100 utilizes pilot sequences constructed from distinct "classes" of chirp sequences with ideal cyclic auto-correlation and optimal cyclic cross-correlation. The construction of such pilot sequences is described below.

Construction of a Set of Pilot Sequences to Use within a Communication System

The construction of the pilot sequences depends on at least two factors, namely, a desired number of pilot sequences needed in a network (K) and a desired pilot length ($N_p$) where K cannot exceed $N_p$. In fact, the number of pilot sequences available that has the ideal cyclic auto-correlation and optimal cyclic cross-correlation is P−1 where P is the smallest prime factor of $N_p$ other than "1" after factoring $N_p$ into the product of two or more prime numbers including "1". For example, the maximum value that P can be is $N_p$−1 when $N_p$ is a prime number. But when $N_p$ is not a prime number, the number of pilot sequences often will be smaller than the desired number K. In order to obtain a maximum number of sequences, the pilot sequence will be constructed by starting with a sequence whose length $N_G$ is a prime number and then performing modifications. In the preferred embodiment, one of the following two modifications is used:

1. Choose $N_G$ to be the smallest prime number that is greater than $N_p$ and generate the sequence set. Truncate the sequences in the set to $N_p$; or
2. Choose $N_G$ to be the largest prime number that is smaller than $N_p$ and generate the sequence set. Repeat the beginning elements of each sequence in the set to append at the end to reach the desired length $N_p$.

The above design of requiring $N_G$ to be a prime number will give a set of $N_G$−1 sequences that has ideal auto correlation and optimal cross correlation. However, if only a smaller number of sequences is needed, $N_G$ does not need to be a prime number as long as the smallest prime factor of $N_G$ excluding "1" is larger than K.

When a modification such as truncating or inserting is used, the auto-correlation will not be precisely ideal and the cross-correlation will not be precisely optimal anymore. However, the auto- and cross-correlation properties are still acceptable. The modified pilot sequence can be referred to as nearly-optimal pilot sequences that are constructed from GCL sequences with optimal auto- and cross-correlation. Further modifications to the truncated/extended sequences may also be applied, such as applying a unitary transform to them.

It should also be noted that while only sequence truncation and cyclic extension were described above, in alternate embodiments of the present invention there exist other ways to modify the GCL sequences to obtain the final sequences of the desired length. Such modifications include, but are not limited to extending with arbitrary symbols, shortening by puncturing, etc. Again, further modifications to the extended/punctured sequences may also be applied, such as applying a unitary transform to them.

The length-$N_p$ sequences are assigned to base units in communication system 100 as the time-domain pilot sequence, or as the frequency-domain pilot sequence (i.e., the entries of the sequence or its discrete IDFT will be assigned onto a set of subcarriers in the frequency domain). If the sequences obtained are used as the time-domain pilot, option 2 will be preferred because the autocorrelation over a size-$N_G$ window is still ideal. If the sequences obtained are used as the frequency-domain pilot and the channel estimation is performed in the frequency domain, the autocorrelation is irrelevant (but the cross-correlation properties of the sequences can still be important in many situations). In this case, either modification 1 or 2 is acceptable with a preference to choosing $N_G$ as the closest to $N_p$.

The final pilot sequences transmitted in time domain can be cyclically extended where the cyclic extension is typically longer than the expected maximum delay spread of the channel ($L_D$). In this case, the final sequence sent has a length equal to the sum of $N_p$ and the cyclic extension length. The cyclic extension can comprise a prefix, postfix, or a combination of a prefix and a postfix. The cyclic extension may also be an inherent part of the communication system used such as an Orthogonal Frequency Division Multiplexing (OFDM) protocol. The inserted cyclic prefix makes the ordinary auto- or cross-correlation appear as a cyclic correlation at any shift that ranges from 0 to the cyclic prefix length. If no cyclic prefix is inserted, the ordinary correlation is approximately equal to the cyclic correlation if the shift is much smaller than the pilot sequence length.

As discussed above, in the preferred embodiment of the present invention Generalized Chirp-Like (GCL) sequences are utilized for constructing pilot sequences. There exists a number of "classes" of GCL sequences and if the classes are chosen carefully (see GCL property 3 below), sequences with those chosen classes will have optimal cross-correlation and ideal autocorrelation. Class-u GCL sequence (S) of length $N_G$ are defined as:

$$S_u = (a_u(0)b, a_u(1)b, \ldots, a_u(N_G-1)b), \quad (1)$$

where b can be any complex scalar of unit amplitude and $$a_u(k) = \exp\left(-j2\pi u \frac{k(k+1)/2 + qk}{N_G}\right), \quad (2)$$

where,
u=1, ... $N_G$–1 is known as the "class" of the GCL sequence,
k=0, 1, ... $N_G$–1 are the indices of the entries in a sequence,
q=any integer.

Each class of GCL sequence can have infinite number of sequences depending on the particular choice of q and b, but only one sequence out of each class is used to construct one pilot sequence.

It should also be noted that if an $N_G$-point DFT (Discrete Fourier Transform) or IDFT (inverse DFT) is taken on each GCL sequence, the member sequences of the new set also have optimal cyclic cross-correlation and ideal autocorrelation, regardless of whether or not the new set can be represented in the form of (1) and (2). In fact, sequences formed by applying a matrix transformation on the GCL sequences also have optimal cyclic cross-correlation and ideal autocorrelation as long as the matrix transformation is unitary. For example, the $N_G$-point DFT/IDFT operation is equivalent to a size-$N_G$ matrix transformation where the matrix is an $N_G$ by $N_G$ unitary matrix. As a result, sequences formed based on unitary transformations performed on the GCL sequences still fall within the scope of the invention, because the final sequences are still constructed from GCL sequences. That is, the final sequences are substantially based on (but are not necessarily equal to) the GCL sequences.

If $N_G$ is a prime number, the cross-correlation between any two sequences of distinct "class" is optimal and there will $N_G$–1 sequences ("classes") in the set (see properties below).

The original GCL sequences have the following properties:

Property 1: The GCL sequence has constant amplitude, and its $N_G$-point DFT has also constant amplitude.

Note that constant amplitude in both the time and frequency domain is desired for a pilot signal. Constant amplitude of the temporal waveform is ideal for a power amplifier to operate at higher output power without causing clipping. Constant amplitude in the frequency domain means that the subcarriers are equally excited and hence the channel estimates will not be biased. However, for multi-carrier systems such as OFDM, some of the subcarriers (typically those at the edges of the band) are unoccupied to form the guard band. The corresponding time-domain pilot waveform is not of constant modulus anymore, but is essentially the result of interpolating the time-domain, i.e., over sampling the sequence to obtain a longer sequence after running it through a "sinc" filter. The resulting waveform still enjoys low peak-to-average ratio (PAPR is typically <3 dB).

Property 2: The GCL sequences of any length have an "ideal" cyclic autocorrelation (i.e., the correlation with the circularly shifted version of itself is a delta function)

Property 3: The absolute value of the cyclic cross-correlation function between any two GCL sequences is constant and equal to $1/\sqrt{N_G}$, when $|u_1-u_2|$, $u_1$, and $u_2$ are relatively prime to NG.

Assignment of Pilot Sequences within a Communication System

Each communication unit may use one or multiple pilot sequences any number of times in any transmission interval or a communication unit may use different sequences at different times in a transmission frame. Additionally, each communication unit can be assigned a different pilot sequence from the set of K pilot sequences that were designed to have nearly-optimal auto correlation and cross correlation properties. One or more communication units may also use one pilot sequence at the same time. For example where multiple communication units are used for multiple antennas, the same sequence can be used for each signal transmitted form each antenna. However, the actual signals may be the results of different functions of the same assigned sequence. Examples of the functions applied are circular shifting of the sequence, rotating the phase of the sequence elements, etc.

Receiver Functions that May Benefit from the Pilot Design:

A number of critical receiver functions are described that can benefit from the above-described pilot design. The examples given here are not exhaustive, and it will be understood by those skilled in the art that various changes in form and details may be made therein without departing from the spirit of utilizing the good auto- and/or cross-correlation of the designed sequence.

1. Single Channel Estimation:

This section shows how the channel estimation can benefit from the above pilot design strategy. In essence, channel estimation can be performed easily by correlating the received data with the pilot sequence. Thanks to the ideal auto-correlation of GCL sequences, the output of the correlation provides the channel estimate. The channel estimate can then be refined, if desired, using a "tap selection" process. An example tap selection process is provided below. Also, time synchronization with the desired base station (BS) can be achieved straightforwardly because the arrival path can be detected easily. If channel information to an interference BS is also needed, it can be obtained from the correlation of the received data with the pilot sequence of that BS. The cross-correlation property increases the accuracy and detection reliability of the significant channel taps and reduces the false detections, as will be explained here.

The GCL sequence effectively spreads the power of each tap of the interference channel evenly across $N_G$ taps thanks to the cross-correlation properties of GCL sequences. Therefore, after correlating with the desired sequence, the interference will be more evenly distributed in the time domain. The significant tap of the desired channel will be preserved better than the smaller taps. In comparison, if non-GCL sequences are used, the power of each tap of the interference will not be evenly distributed across $N_G$ taps. The distortion effect on the desired channel varies from tap to tap with an unpredictable behavior. Hence, with non-GCL sequences, the detected significant taps are more likely to be false due to the interference, or the true significant taps can be distorted so much that they become undetectable. The interference power on each desired tap is $P_I/N_G$ with $P_I$ being the interference power; in other words, the spreading factor for each interference channel tap is $N_G$.

The correlation is typically performed in the time domain. But correlation can also be performed in the frequency domain as will be described below. Frequency domain estimation may be more computationally efficient because of the FFT operation and is preferred for multicarrier systems such as OFDM systems. The example below is for an OFDM system.

First, assume the frequency domain received data is $Y(m)$ where m is a pilot subcarrier. Assume $S_G(m)$ is the pilot when m is a pilot subcarrier and zero otherwise, then a "noisy" channel estimate at the pilot subcarriers can be obtained as:

$$H_n(m) = \begin{cases} \frac{Y(m)}{S_G(m)} & \text{if } S_G(m) \neq 0 \\ 0 & \text{if } S_G(m) = 0 \end{cases} \quad (3)$$

The noisy estimates will be transformed to the time domain through an IDFT as $$\hat{h}_w = IDFT(\{H_n(m)w(m)\}), \quad (4)$$

where w is a weighting window applied onto the noisy frequency response. The window is to reduce the power leakage problem caused by the discontinuity from the edge to null subcarriers (since zeros are inserted in place of the null subcarriers before the IDFT). A "Hanning" window can be used, i.e., $$w(m) = \left(0.5 + 0.5\cos\frac{2\pi m}{\Gamma}\right), \quad (5)$$

where the parameter $\Gamma$ controls the shape of the window (an infinite $\Gamma$ means a flat window).

The resulting $\hat{h}_w$ will then be truncated to length-LD to obtain $\hat{h}_{w,L}$. Furthermore, only the "significant" channel taps in $\hat{h}_{w,L}$ should be included before being DFT'd back to get the frequency domain response, i.e., $$\hat{H}_{w,L} = IDFT_N(\hat{h}_{w,L}). \quad (6)$$

The tap selection procedure is important, as described earlier, for exploiting the cross-correlation property of the pilot sequences. Tap selection also tries to enforce the frequency correlation according to the instantaneous channel delay profile, which can improve the channel estimation especially in the case of a sparse channel.

A threshold (denoted as $\eta$) used in tap selection should be determined according the noise-plus-interference power estimated previously, or the total noise-plus-interference power over the used bandwidth can be estimated from the samples in $\hat{h}_w$ that will be discarded (after $L_D+1$). Note that compensation for the windowing effect is recommended during noise power estimation. Based on the above noise-plus-interference power over the occupied bandwidth, the corresponding time-domain reference noise-plus interference power at each tap (denoted as $\sigma^2$) can be easily derived after accounting for the zeros at those null-subcarrier positions.

Finally $\hat{h}_{w,L}$ will be transformed back to the frequency domain with a DFT to obtain the frequency channel response, and the windowing effect of (5) is preferably "de-emphasized", i.e., $$\hat{H}_{est}(m) = \hat{H}_{w,L}(m)/w(m). \quad (7)$$

2. Multiple Channel Estimation:

When multiple channels corresponding to different pilot sequences are needed, the above single channel estimation process is conducted for the different pilot sequences one at a time or simultaneously. The characteristics learned about other channels can be useful to improve the speed and performance of handoff, to perform interference suppression at the receiver for better demodulation and decoding, to enable the base unit to intelligently schedule transmission to avoid interference, etc.

3. Synchronization Acquisition and Tracking:

One way to achieve good initial acquisition of synchronization to the desired base unit is to first correlate the received signal with the pilot sequence candidates. The results will be assessed to find the desired base unit (e.g., the strongest one). The characteristics learned from the correlation with the desired pilot sequence may be used to adjust the timing and frequency of the receiver to achieve synchronization. For example, the channel knowledge will give a good indication of the arrival time of the propagation paths and their strength, so the sample timing can be adjusted accordingly. The correlation results may also be used to adjust the frequency offset of the receiver. For example, correlation results from pilot sequences received at nearby but different times can be compared to identify the frequency offset. In another example, when the pilot sequence is mapped onto a set of OFDM subcarriers, a frequency domain correlation can identify frequency offsets to the nearest integer number of subcarriers.

The tracking of the synchronization to the desired signal can also be accomplished through the correlation results where only correlation with the desired pilot is required. The fine tuning of the timing and frequency offset can be achieved as in the initial acquisition step.

Another type of synchronization required is frame synchronization. Since a frame consists of many symbols, the information content at different locations within a frame may be different. The ability to detect the frame boundary is a prerequisite for decoding the information. The pilot sequences can be used to support this function as well. For example, if multiple pilot sequences are assigned in a frame and the location of each sequence relative to the frame boundary is designed to be fixed, when a certain pilot sequence is detected, the frame boundary can then be determined.

Figure 3:
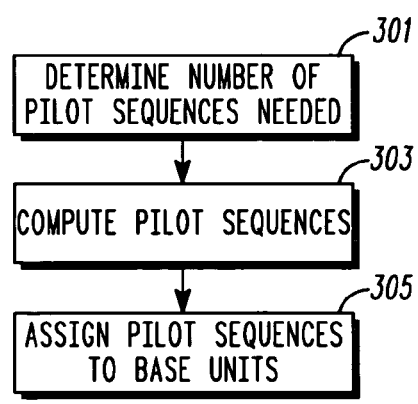
FIG. 3 is a flow chart showing pilot sequence assignment for the communication system of FIG. 1.

FIG. 3 is a flow chart showing the assignment of pilot codes to various base units within communication system 100. The logic flow begins at step 301 where a number of needed pilots (K), desired pilot length ($N_p$) and a candidate length ($N_G$) of each pilot sequence are determined. Based on $N_p$ and $N_G$, the pilot sequences are computed (step 303). As discussed above, the pilot sequences are constructed from the Generalized Chirp-Like (GCL) sequences of length $N_p$, with each GCL sequence being defined as shown in equation (1). Finally, at step 305, the pilot sequences are assigned to base units within communication system 100. It should be noted that each base unit may receive more than one pilot sequence from the K available pilot sequences. However, at a minimum a first base unit is assigned a first pilot sequence taken from a group of GCL sequences while a second base unit is assigned a differing pilot sequence from the group of GCL sequences. During operation, pilot channel circuitry within each base unit will transmit the pilot sequence as part of an overall strategy for coherent demodulation. Particularly, each remote unit within communication with the base units will receive the pilot sequence and utilize the pilot sequence for many functions, such as channel estimation as part of a strategy for coherent demodulation of the received signal.

As described above, the pilot sequences of the present invention have a low peak-to-average ratio (PAPR). As a result, the PAPR of a pilot signal/sequence of the present invention is lower than the PAPR of data signals that are also transmitted by a communication unit. The low PAPR property of the pilot signal enables pilot channel circuitry 107 to transmit the pilot signal with a higher power than the data in order to provide improved signal-to-noise/interference ratio on the pilot signal received by another communication unit, thereby providing improved channel estimation, synchronization, etc.

While the invention has been particularly shown and described with reference to a particular embodiment, it will be understood by those skilled in the art that various changes in form and details may be made therein without departing from the spirit and scope of the invention. For example, although the above discussion was related to assignment of pilot sequences to base units, it would be obvious to one of ordinary skill in the art that such pilot sequences may be assigned to other forms of transmitters/systems, such as but not limited to remote units, in which case the base station tries to detect the desired remote unit and estimate its channel. It is intended that such changes come within the scope of the following claims.

The invention claimed is:

1. A method for assigning a pilot sequence to communication units within a communication system, the method comprising the steps of:
    assigning a first communication unit a first pilot sequence, wherein the first pilot sequence is selected from a group of pilot sequences constructed from a set of Generalized Chirp-Like (GCL) sequences; and
    assigning a second communication unit a second pilot sequence taken from the group of pilot sequences constructed from the set of GCL sequences, wherein the first and the second pilot sequences are constructed from the GCL sequences or from sequences resulting from taking a size-$N_G$ unitary transformation of the GCL sequences; and the GCL sequences are generated as $$S_u = (a_u(0)b, a_u(1)b, \ldots, a_u(N_G-1)b),$$

where b is any complex scalar of unit amplitude and $$a_u(k) = \exp\left(-j2\pi u \frac{k(k+1)/2 + qk}{N_G}\right),$$

where,
    u=1, ... $N_G$-1 is known as the "class" of the GCL sequence
    k=0, 1, ... $N_G$-1
    q=any integer.

2. The method of claim 1 wherein the step of assigning the first communication unit the first pilot sequence comprises the step of assigning a first base unit the first pilot sequence, and wherein the step of assigning the second communication unit the second pilot sequence comprises the step of assigning a second base unit the second pilot sequence.

3. The method of claim 1 wherein the step of assigning the first communication unit the first pilot sequence comprises the step of assigning a first remote unit the first pilot sequence, and wherein the step of assigning the second communication unit the second pilot sequence comprises the step of assigning a second remote unit the second pilot sequence.

4. The method of claim 1 wherein the step of assigning the first communication unit the first pilot sequence comprises the step of assigning a first sector of a base station the first pilot sequence, and wherein the step of assigning the second communication unit the second pilot sequence comprises the step of assigning a second sector of the base station the second pilot sequence.

5. The method of claim 1 wherein the step of assigning the first communication unit the first pilot sequence comprises the step of assigning a first antenna of a sector of the base station the first pilot sequence, and wherein the step of assigning the second communication unit the second pilot sequence comprises the step of assigning a second antenna of a sector of the base station the second pilot sequence.

6. The method of claim 1 wherein prior to assigning the first and the second communication units the first and the second pilot sequences, performing the step of determining a length of the pilot sequences ($N_G$) based on a number of pilot sequences needed in the communication system (K) and a desired pilot sequence length ($N_p$).

7. The method of claim 6 further comprising the step of:
    choosing $N_G$ to be equal to $N_p$ if the smallest prime factor of $N_p$ excluding "1" is larger than K.

8. A method for assigning a pilot sequence to communication units within a communication system, the method comprising the steps of:
    assigning a first communication unit a first pilot sequence, wherein the first pilot sequence is selected from a group of pilot sequences constructed from a set of Generalized Chirp-Like (GCL) sequences;
    assigning a second communication unit a second pilot sequence taken from the group of pilot sequences constructed from the set of GCL sequences, wherein prior to assigning the first and the second communication units the first and the second pilot sequences, performing the step of determining a length of the pilot sequences ($N_G$) based on a number of pilot sequences needed in the communication system (K) and a desired pilot sequence length ($N_p$);
    further comprising the step of:
    choosing $N_G$ to be a smallest integer that is greater than $N_p$ and whose minimum prime factor excluding "1" is larger than K and generating the set of GCL sequences by truncating sequences in the set to $N_p$; or
    choosing $N_G$ to be a largest integer that is smaller than $N_p$ and whose minimum prime factor excluding "1" is larger than K, and generating the set of GCL sequences set by repeating beginning elements of each sequence in the set to append at an end of each sequence to reach the desired length $N_p$.

9. The method of claim 1 wherein the step of assigning the first communication unit the first pilot sequence comprises the step of assigning the first communication unit a pilot sequence constructed from the class-$u_1$ GCL sequence; and
    wherein the step of assigning the second communication unit the second pilot sequence comprises the step of assigning the second communication unit a pilot sequence constructed from the class-$u_2$ GCL sequence that satisfies the requirement of $|U_1-U_2|$ being relatively prime to $N_G$.

10. A method comprising the steps of:
    receiving a pilot sequence as part of an over-the-air transmission, wherein the pilot sequence is constructed from a set of Generalized Chirp-Like (GCL) sequences and is assigned to either a base unit or a remote unit, wherein the pilot sequence is based on a truncated GCL sequence or a cyclically extended GCL sequence; and utilizing the pilot sequence for at least one of the following:
acquisition and tracking of timing and frequency synchronization, estimation and tracking of desired channels for subsequent demodulation and decoding, estimation and monitoring of characteristics of other channels for handoff purposes, and interference suppression;

wherein the step of receiving the pilot sequence comprises the step of receiving the pilot sequence constructed from GCL sequences or from sequences resulting from taking a size-$N_G$ unitary transformation of the GCL sequences, and the GCL sequences are generated as $$S_u = (a_u(0)b, a_u(1)b, \ldots, a_u(N_G-1)b),$$

where b is any complex scalar of unit amplitude and $$a_u(k) = \exp\left(-j2\pi u \frac{k(k+1)/2 + qk}{N_G}\right),$$

where,
u=1, ... $N_G$-1 is known as the "class" of the GCL sequence
k=0, 1, ... $N_G$-1
q=any integer.

11. The method of claim 10 wherein the step of receiving the pilot sequence comprises the step of receiving the pilot sequence at a base unit.

12. The method of claim 10 wherein the step of receiving the pilot sequence comprises the step of receiving the pilot sequence at a remote unit.

13. A communication unit comprising:
pilot channel circuitry for transmitting or receiving a first pilot channel sequence,
wherein the first pilot channel sequence comprises a sequence from a group of pilot sequences constructed from a set of Generalized Chirp-Like (GCL) sequences and
wherein the pilot channel circuitry is further for transmitting or receiving a second pilot channel sequence taken from the group of pilot sequences constructed from the set of GCL sequences and
wherein the GCL sequence is equal to $$S_u = (a_u(0)b, a_u(1)b, \ldots, a_u(N_G-1)b),$$

where b is a complex scalar of unit amplitude and $$a_u(k) = \exp\left(-j2\pi u \frac{k(k+1)/2 + qk}{N_G}\right),$$

where,
u=1, ... $N_G$-1 is the "class" of the GCL sequence
k=0, 1, ... $N_G$-1
q=any integer.

14. The communication unit of claim 13 further comprising:
data channel circuitry for transmitting data, wherein a peak to average power ratio (PAPR) of the first pilot channel sequence is lower than a PAPR of data transmitted over the data channel circuitry.

15. The communication unit of claim 14 wherein the first pilot channel sequence is transmitted at a higher power than the data.

16. A method for assigning a pilot sequence to communication units within a communication system, the method comprising the steps of:
assigning a first communication unit a first pilot sequence, wherein the first pilot sequence is selected from a group of pilot sequences constructed from a set of Generalized Chirp-Like (GCL) sequences; and
assigning a second communication unit a second pilot sequence taken from the group of pilot sequences constructed from the set of GCL sequences,
wherein at least one of the following characteristics applies:
the first pilot sequence is constructed from a Generalized Chirp-Like (GCL) sequence of a first class and the second pilot sequence is constructed from a Generalized Chirp-Like (GCL) sequence of a second class,
the second pilot sequence is based on a function of the first sequence and wherein the function of the first sequence is based on at least one of circular shifting of the first sequence and rotating the phase of elements of the first sequence,
the first pilot sequence is of length $N_P$, and is based on a truncation of a length $N_G$ Generalized Chirp-Like (GCL) sequence where $N_G$ is the smallest prime number that is larger than $N_P$, or
the first pilot sequence is of length $N_P$, and is based on an extension of a length $N_G$ Generalized Chirp-Like (GCL) sequence where $N_G$ is the largest prime number that is smaller than $N_P$ and the extension is based on appending a repetition of the beginning elements of the GCL sequence to the end to reach the length $N_P$.

17. The method of claim 16 wherein the first and second communication units each comprise an antenna of a base unit or each comprise an antenna of a remote unit.

18. The method of claim 16
wherein assigning the first communication unit the first pilot sequence comprises assigning a first antenna of a remote unit the first pilot sequence, and
wherein assigning the second communication unit the second pilot sequence comprises assigning a second antenna of the remote unit the second pilot sequence.

19. The method of claim 16 wherein the first pilot sequence is based on a truncated Generalized Chirp-Like (GCL) sequence.

20. The method of claim 16, wherein the first pilot sequence is based on a cyclically extended Generalized Chirp-Like (GCL) sequence.

21. The method of claim 16 wherein the first pilot sequence is assigned to a set of subcarriers in the frequency domain.

22. The method of claim 16 further comprising utilizing by the first communication unit different sequences for transmission at different times in a transmission frame.

23. The method of claim 16 wherein assigning the first communication unit the first pilot sequence comprises assigning the first communication unit a pilot sequence constructed from a class-$u_1$ GCL sequence and
wherein assigning the second communication unit the second pilot sequence comprises assigning the second communication unit a pilot sequence constructed from a class-$u_2$ GCL sequence that satisfies the requirement of |U1-U2| being relatively prime to $N_G$, where $N_G$ is a length of the GCL sequence from which the first pilot sequence is constructed.

24. The method of claim 20 wherein the first and second communication units each comprise an antenna of a base unit or each comprise an antenna of a remote unit.

25. The method of claim 20
wherein assigning the first communication unit the first pilot sequence comprises assigning a first antenna of a remote unit the first pilot sequence, and
wherein assigning the second communication unit the second pilot sequence comprises assigning a second antenna of the remote unit the second pilot sequence.

26. The method of claim 20 wherein the first pilot sequence is assigned to a set of subcarriers in the frequency domain.

27. The method of claim 20 further comprising utilizing by the first communication unit different sequences for transmission at different times in a transmission frame.

28. A method for assigning a pilot sequence to communication units within a communication system, the method comprising the steps of:
assigning a first communication unit a first pilot sequence, wherein the first pilot sequence is selected from a group of pilot sequences constructed from a set of Generalized Chirp-Like (GCL) sequences; and
assigning a second communication unit a second pilot sequence taken from the group of pilot sequences constructed from the set of GCL sequences, wherein the first pilot sequence is based on a cyclically extended Generalized Chirp-Like (GCL) sequence,
wherein assigning the first communication unit the first pilot sequence comprises assigning the first communication unit a pilot sequence constructed from a class-$u_1$ GCL sequence and
wherein assigning the second communication unit the second pilot sequence comprises assigning the second communication unit a pilot sequence constructed from a class-$u_2$ GCL sequence that satisfies the requirement of $|U1-U2|$ being relatively prime to $N_G$, where $N_G$ is a length of the GCL sequence from which the first pilot sequence is constructed.

* * * * *